Nov. 20, 1928.

E. C. MILLER 1,692,559

CANDY MAKING MACHINE

Filed Dec. 7, 1922    4 Sheets-Sheet 1

INVENTOR
Esech C. Miller
BY
ATTORNEY

Nov. 20, 1928.  
E. C. MILLER  
1,692,559  
CANDY MAKING MACHINE  
Filed Dec. 7, 1922    4 Sheets-Sheet 3

INVENTOR  
Eseck C. Miller.  
BY  
Morris Kirschstein  
ATTORNEY

Nov. 20, 1928.
E. C. MILLER
CANDY MAKING MACHINE
Filed Dec. 7, 1922
1,692,559
4 Sheets-Sheet 4
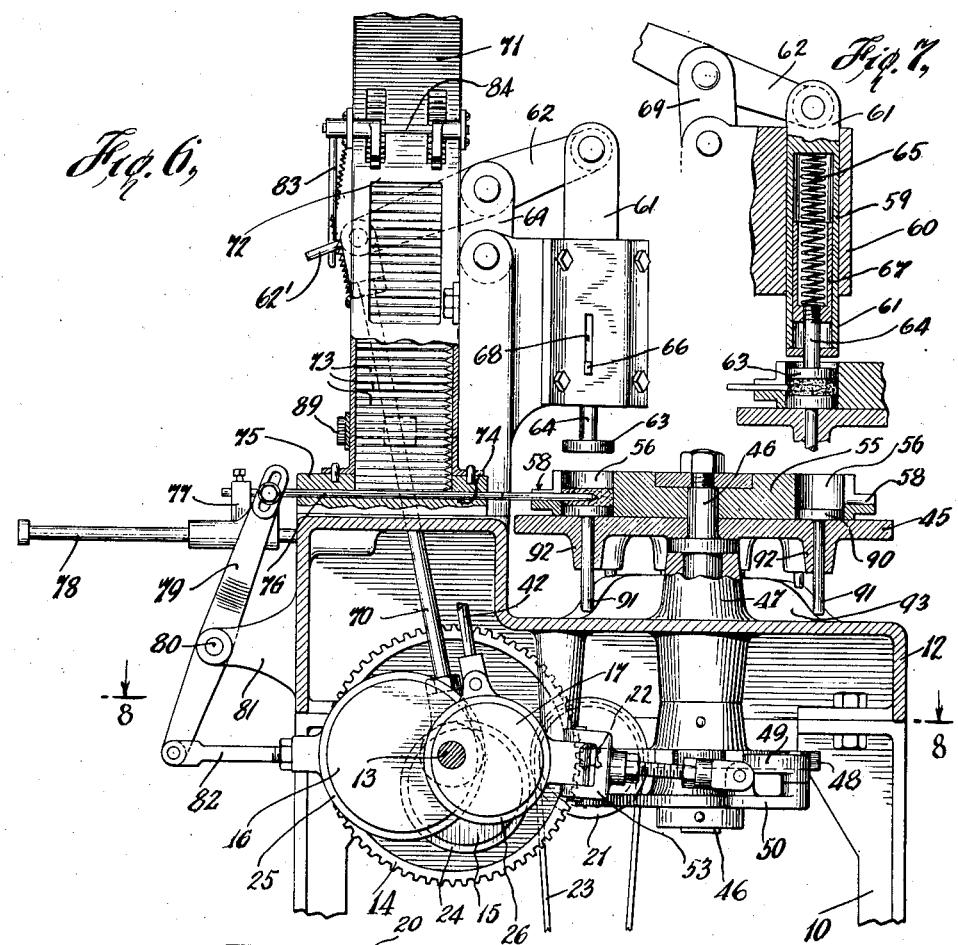
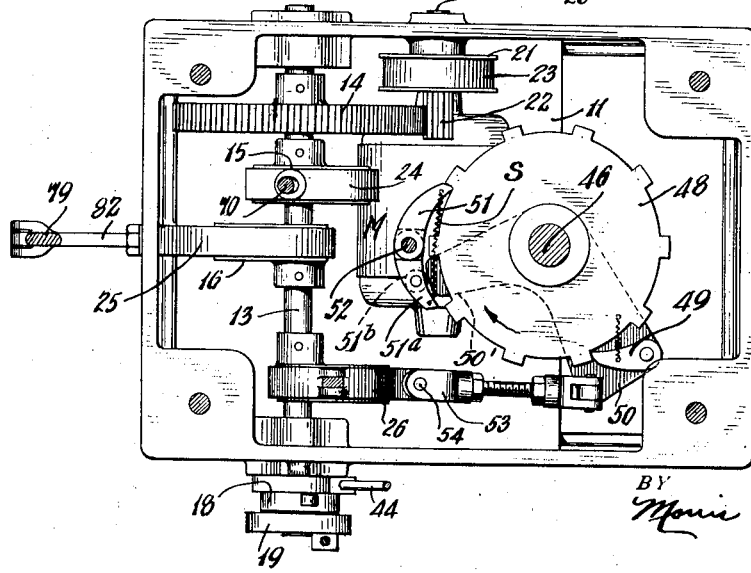
INVENTOR
Eseck C. Miller.
BY
ATTORNEY Patented Nov. 20, 1928.

1,692,559

UNITED STATES PATENT OFFICE.

ESECK C. MILLER, OF NEWARK, NEW JERSEY, ASSIGNOR, BY MESNE ASSIGNMENTS, TO RACINE CONFECTIONERS MACHINERY COMPANY, OF RACINE, WISCONSIN, A CORPORATION OF WISCONSIN.

CANDY-MAKING MACHINE.

Application filed December 7, 1922. Serial No. 605,516.

This invention relates to candy machines and has particular reference to machines for the rapid and automatic manufacture of specially shaped pieces of candy such as lolly pops or the like.

Among the objects of the invention is to generally improve this type of machine along a number of lines including the provision of novel means for introducing and feeding the candy mass and severing pieces thereof for making single finished pieces of candy, together with novel means for removing the severed pieces from the severing means and depositing the same successively into the successive mold cavities in a revolving mold carrier, the provision of improved and novel means for controlling the feed of the sticks toward the means for introducing them into the candy pieces; a novel plunger mechanism for completing the shaping of the several pieces, and otherwise to improve this kind of machine to render the same more efficient, reliable and economical in practice, having in view the character of the material being treated.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a front elevation of a preferred embodiment of the invention, parts being broken away to conserve space;

Fig. 6 is an approximately central vertical section about on the broken line 6—6 of Fig. 3;

Fig. 7 is a detail view of the die plunger shown at the upper portion of Fig. 6 but in its changed position while forming the finished piece; and Fig. 8 is a horizontal section on the line 8—8 of Fig. 6 showing the major operating mechanism in plan.

Figures 1, 2:
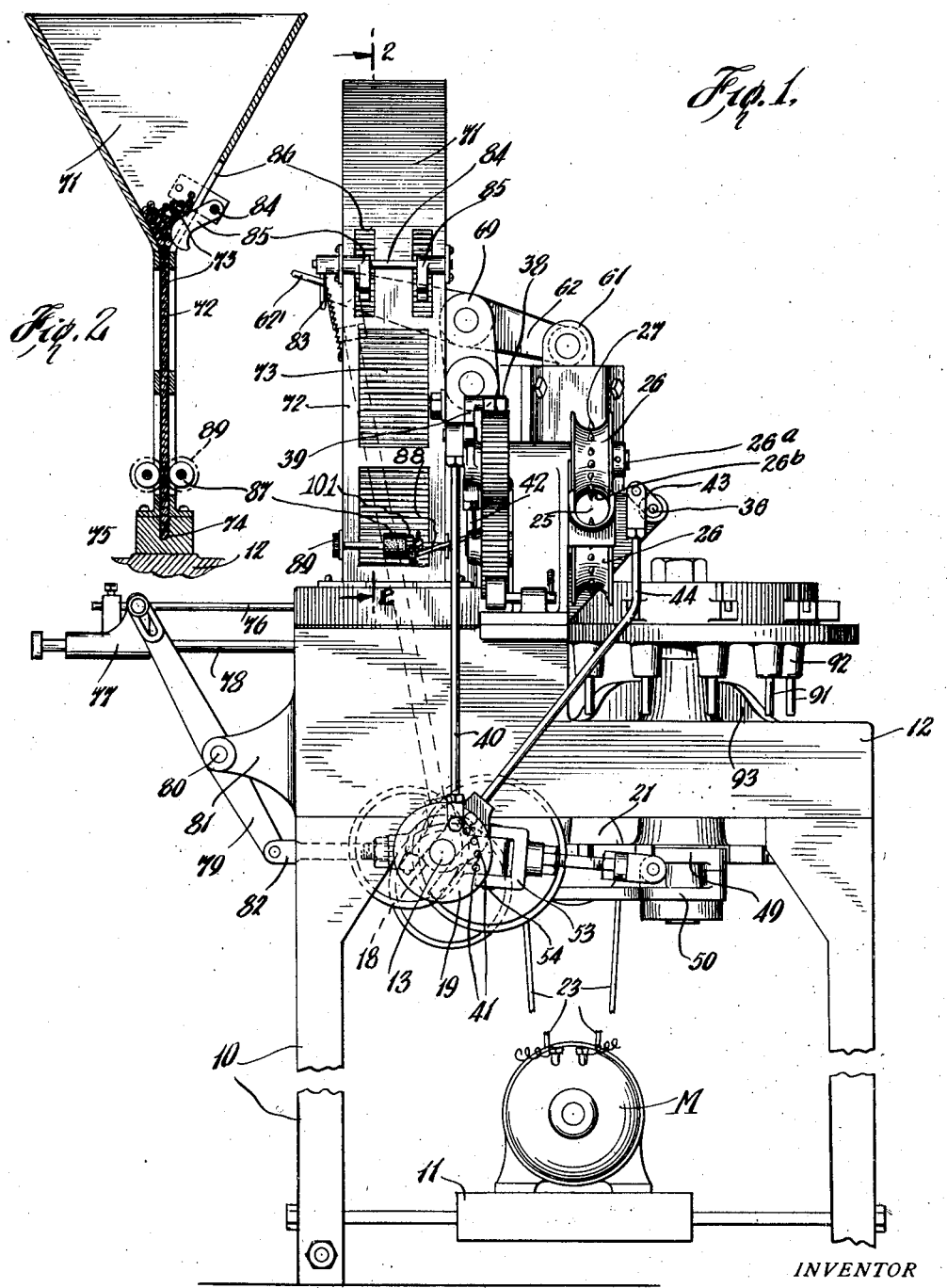
Fig. 2 is a partial vertical section on line 2—2 of Fig. 1.

Referring in detail to the drawings, I indicate at 10 any suitable size, construction, or design of frame having near its bottom a platform 11 upon which is mounted a prime mover such as a motor M, making the machine practically self contained and adapted for use in any convenient place. As to materials as well as design of the several parts I have to observe that I am not to be limited unnecessarily except as may be required by the state of the art. Constituting a part of the frame or suitably affixed to the upper portion thereof is what may be termed a table 12, upon or in connection with which the several principal operating parts are arranged.

Close within or beneath said table top is journaled a horizontal shaft 13 upon which is secured a gear 14, a series of eccentrics 15, 16, 17 and 18, and also a crank disk 19, the last two elements being indicated as in front of the machine frame. Journaled adjacent and parallel to the shaft 13 is a power shaft 20 on which are secured a belt pulley 21 and a pinion 22, the latter meshing with and driving the gear 14. A belt 23 running from the motor shaft serves to drive the pulley 21 and the parts just referred to. Associated with the eccentrics 15, 16 and 17 are eccentric straps 24, 25 and 26 respectively.

Figure 3:
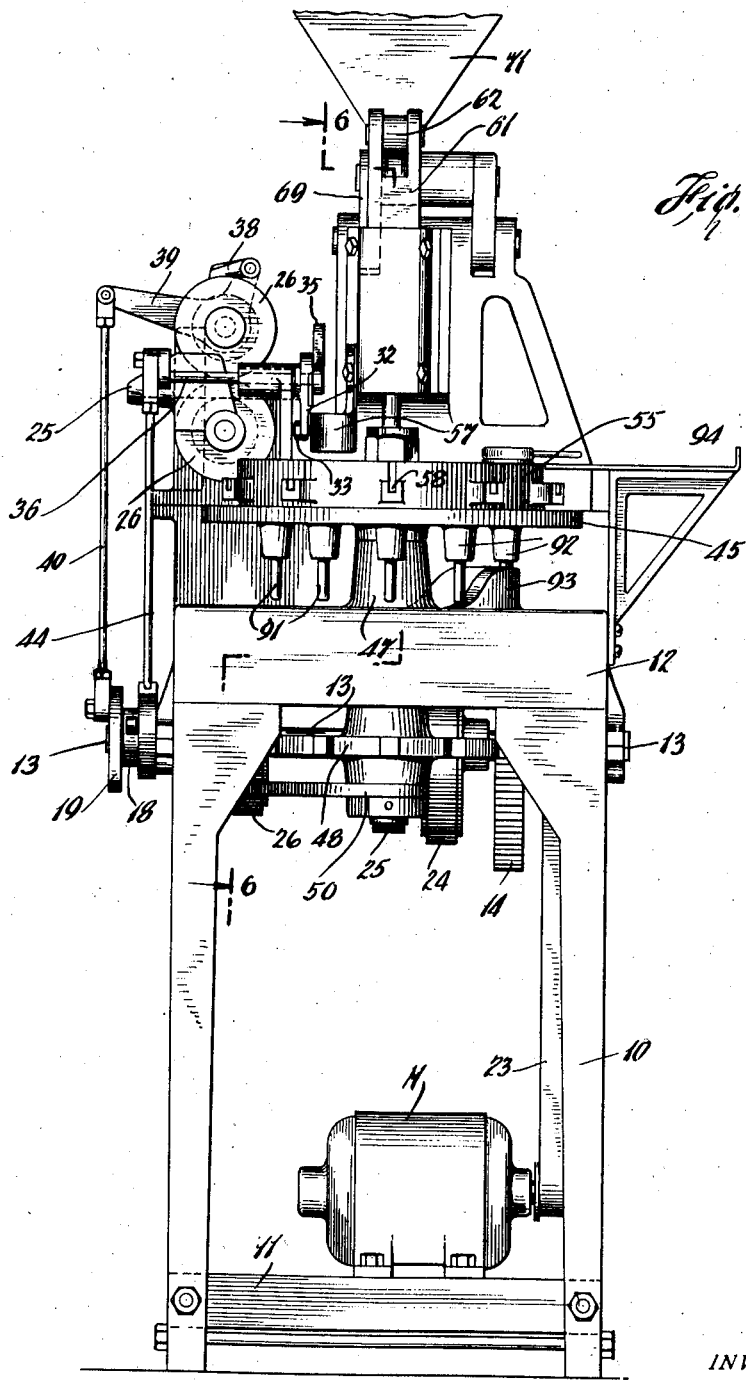
Fig. 3 is a side elevation of the machine as it would be seen looking toward the left in Fig. 1.
Figure 4:
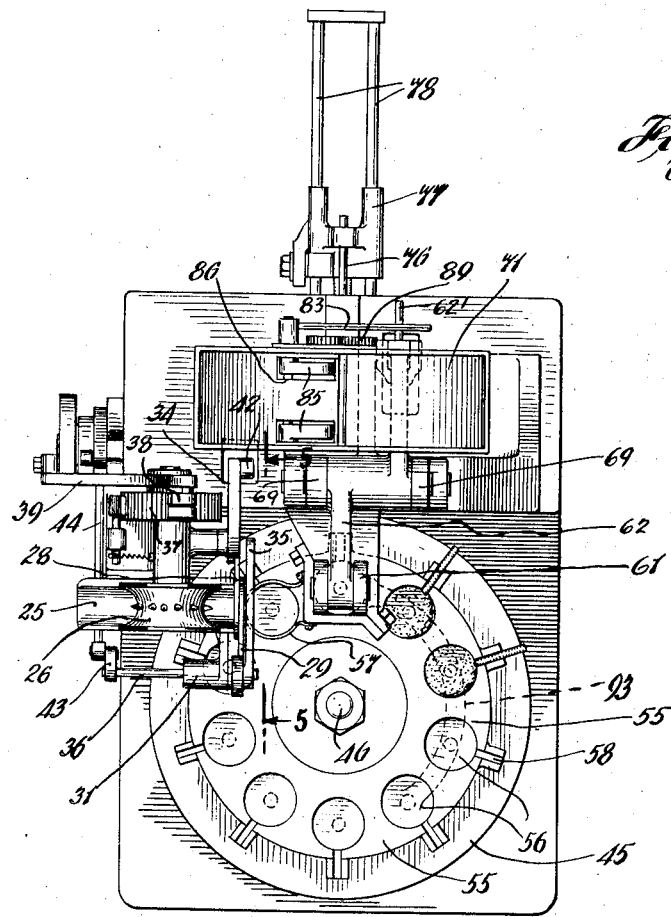
Fig. 4 is a plan view.
Figure 5:
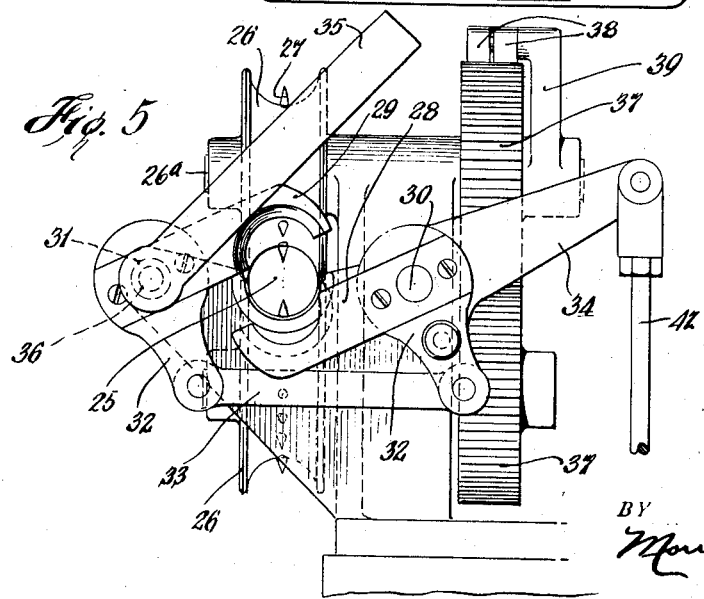
Fig. 5 is an enlarged detail of the means for feeding the bulk material or candy mass toward the molding mechanism and severing off the individual charges therefrom, the view being such as would be seen looking toward the left from the plane indicated by the line 5—5 of Fig. 4.

The candy mass (not shown) will be understood as being fed or delivered into a receiving guide-way or throat 25 as shown in Fig. 3 where it is grasped and urged inward by and between a pair of feed rolls 26, each mounted on parallel straps 26ª and each having a semi-circular groove 26ᵇ and a series of teeth 27 formed in the bottom thereof. The mating grooves of the two rolls form the candy mass into cylindrical shape and urge the same inward along the guide-way 25 toward the blades 28 and 29 which cut from the mass predetermined charges or candy units (see Fig. 5). These blades 28, 29 are connected respectively to two rock shafts 30 and 31 journaled on opposite sides of the guide-way 25 and from which extend a pair of arms 32, connected for conjoint action or swinging movement in the same direction to a link 33. An arm 34 connected to one of the aforesaid arms or shafts serves to cause oscillatory movement of the blades, and since the blades extend in opposite directions from their respective rock shafts toward the guide-way, the movement of the arms 32 in the same direction causes the blades to approach the guide-way. It will be noted (see Fig. 4) that the blades operate in spaced parallel planes so that the blade 29 is adapted to pass the cutting edge portion of the blade 28 with a shearing action causing the charge or unit not only to be severed from the main mass, but to be cleared from the blades themselves, a matter of considerable importance having in view the nature of the commodity. A member 35 which may be termed a "knocker" or scraper is fixed to the shaft 36 co-axial with the shaft 31 and at the proper moment this knocker completes the clearance or separation of the severed unit from the cutting blades causing the same to be delivered into the molding mechanism soon to be described. This knocker device is of particular importance and advantage when the machine is being operated in warm weather when the candy mass is very sticky and has a tendency to stick to the knife blades or the guide-way. Under such conditions, unless effective means such as this knocker device be provided, timing of the operation of the various parts of the machine would be interfered with by reason of the sticking of the candy mass to the parts mentioned and not being delivered into the molding mechanism at proper and regular intervals.

The rolls 26 are geared together for simultaneous operation by means of gears 37 connected to the shafts 26ª of the rolls and operated step by step or intermittently by means of one or more pawls 38 pivoted to the short arm of a bell crank 39 and from which a connecting rod 40 leads to any selected hole 41 of the crank disk 19, the holes being arranged at different distances from the center of the disk for varying the effective throw of the bell crank 39 and the extent of feed of the feed rolls 26, as will be readily understood. The arm 34 is connected through a connecting rod 42 to the top of the eccentric strap 26. It will of course be understood that the several eccentrics will be so adjusted angularly upon the shaft 13 and with suitable throws to perform their several functions not only at the proper time but with a suitable degree of action. The shaft 36 for the knocker 35 is rocked by an arm 43 from which a connecting rod 44 leads to the eccentric 18.

The molding mechanism is arranged in a reduced portion of the table top 12 and comprises a turn table 45 mounted upon and rotatable with a vertical shaft 46 journaled in a bearing 47 and carrying at its lower end a ratchet wheel 48, with which co-operates a pawl 49 mounted upon one arm of a bell crank 50 pivoted upon the lower end of the shaft. A double pawl arrangement consisting of pawls 51 and 51ª are loosely mounted on a stationary pivot 52 and functions to prevent a reverse movement of the ratchet wheel. These pawls 51 and 51ª are adapted to span two contiguous teeth of the ratchet wheel 48. The pawl 51ª carries a movable roller 51ᵇ against which the other arm 50′ of the bell crank 50 may act to push the pawl 51ª out of engagement with the ratchet wheel at the time when it is desired to free the ratchet wheel for rotation. A tension spring s is provided to connect the pawls 51 and 51ª together that tends to hold the same against the wheel 48. When the bell crank 50 starts its movement to the left in Fig. 8 and just before the time when the pawl 49 carried thereby engages the tooth of the wheel 48, the arm 50′ of the lever 50 engages the roll 51ᵇ of the pawl 51ª and moves the same from engagement with the wheel to allow a tooth to pass by the end of the pawl. The spring s tends to pull the pawl 51 against the wheel and allows a ratchet action of the pawl and teeth of the wheel and prevents a reverse movement of the said wheel. The spring also tends to pull the pawl 51ª against the wheel when the said pawl is disengaged by the lever arm 50′ and when so disengaged the said pawl will abut the side of a tooth of the wheel to prevent a further rotation of the wheel. As will be seen from Fig. 8 the said pawls 51 and 51ª prevent a reverse rotation of the wheel and also serve to hold the wheel in a stationary position when not being actually operated upon by the pawl 49. The bell crank 50 is operated by the connecting rod 53 having jointed connection at 54 with the eccentric strap 26 so that for each rotation of the shaft 13 the wheel 48 and turn table will be given a forward step or partial rotation.

Suitably secured upon the turn table 45 is a die 55 having formed therein a plurality of mold cavities or pits 56 arranged in a circular series concentric with the shaft 46 and adapted to receive the several charges of candy as the same are severed from the mass as described above. 57 indicates a vertically arranged guide adjacent to the field of action of the blades 28 and 29 into and through which each candy unit c is delivered and directed toward the pit beneath the guide at the time. It will be understood that the die plate 55 may have its pits made in any desired shape according to the intended shape for the output of the machine. Co-operating with each pit 56 is a radially arranged channel 58 the axis of which is diametrical of the pit to which it leads. The purpose of this channel 58 will hereinafter appear. As indicated the die plate is provided with as many pits are there are teeth formed on the ratchet wheel 48, the teeth and pits being correspondingly spaced.

59 indicates a plunger mechanism including a guide bracket 60, a plunger 61, and operating lever 62. (See Figs. 6 and 7.) 63 is a plunger die shaped to conform to the pits 56 and into which it is adapted to be forced by the operation of the lever 62. This plunger die has a stem 64 extending into the lower end of the plunger 61 and movable axially therewith relatively. An expansion spring 65 is interposed between said die stem and the upper portion of the plunger 61 and tends to force the die downward and away from the lower end of the plunger 61 as shown in Fig. 7, this movement however being limited by a key 66 projecting laterally from the cap 67 and through a slot 68 formed in the bracket 60. The spring 65 functions, moreover, to force downward the die 63 coincidentally with the downward movement of the plunger 61 so as to compress resiliently and shape the mass c as shown in Fig. 7. The plunger lever 62 is mounted upon a pivoted link 69 at the top of the bracket 60 and this lever is operated by a connecting rod 70 attached to its opposite end and co-operating with the eccentric strap 24. Hence for each rotation of the shaft 13 the plunger mechanism at 59 will be reciprocated, forming one candy piece.

Conveniently arranged is a hopper 71 having a chute 72 leading downward from the bottom thereof and through which sticks 73 are fed in single file in a groove 74 which lies in horizontal alignment with the several channels 58 as they come into position adjacent thereto. This groove is formed in a guide block 75 at the top of the table structure 12, and adapted to reciprocate in said groove is a horizontal plunger 76 whose outer end is secured to a slide 77 guided for reciprocation along a pair of guide rods 78 extending laterally from the machine and whereby the plunger 76 is relieved from all weight or strain except such as is incident to its intended longitudinal movement. 79 is a lever pivoted as at 80 upon a fixed bracket 81 extending from the machine frame and whose opposite end is connected through a connecting rod 82 to the eccentric strap 25. At each reciprocation of the plunger 76 toward the molding mechanism the lowermost stick 73 is driven along the channel 58 so that its point comes within the central portion of the pit 56, and the stick is forced into the candy charge C. At the next rotation of the shaft 13 and consequent interval of movement of each of the other parts the turn table will be rotated bringing a new charge into position to be molded. A tail pin 62′ extending from the lever 62 co-operates with a feeder arm 83 connected to a rock shaft 84 journaled along the front side of the hopper 71 and having one or more fingers 85 reaching through slots 86 in the face of the hopper for the purpose of breaking up any clogging or bridging of the sticks in the bottom of the hopper and compelling the delivery of the sticks in proper order into and through the chute 72. Adjacent to the lower end of the chute are a pair of co-operating rollers 87 arranged on opposite sides of the line of sticks 73 and caused to rotate step by step by a ratchet mechanism 101 which is operated by means of a finger 88 extending outward from any suitable reciprocating member such as the connecting rod 42 and whereby the rollers 87 will be positively actuated in a step by step manner and whereby the lowermost sticks will be forced downward in proper turn making it impossible for the supply of sticks to fail so long as there are sticks in the chute. The shafts of these rollers 87 are geared together for positive co-operation by gears 89.

Located in each of the pits is a companion die 90 (Fig. 6) which may be referred to hereinafter as the pit die, the same being normally located at the bottom of the pit and having a stem 91 extending downward through and below a guide boss 92 formed at the bottom of the turn table. The lower end of this stem co-operates with a cam face 93 formed back of the bearing 47. As will be understood from Fig. 3, the riding upon and over this cam 92 of the respective stems 91 causes the ejection of the units c from the pits so that they may be disposed of in any suitable manner for wrapping or packing adjacent to the shelf or table 94.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a candy machine the combination of means for feeding the mass of plastic material and including a guide, a pair of cooperating cutting blades at the end of said guide for slicing units from said material with a shearing action, the end of said guide acting as a scraper to clear the adjacent face of the inner blade, and a scraper acting at the outer face of the outer blade for clearing the same of material.

2. In a candy machine, the combination with means to feed the mass of material including a guide member, of severing means including a pair of blades, a pair of rock shafts one at each side of said guide member upon which the blades are affixed and from which the blades extend in opposite directions, and means connecting the rock shafts for simultaneous movement in the same direction to cause the blades to co-operate with each other.

3. In a candy machine, the combination with means to feed the mass of material including a guideway, of means to sever unit masses of material therefrom, said severing means including a pair of arms pivotally mounted on opposite sides of the guideway, means connecting the arms for simultaneous movement about their several centers in the same direction, and a pair of blades connected to the arms and extending across the guideway and adapted to cooperate with each other with a shearing action when the arms are actuated.

4. In a lollypop machine, means for feeding and sizing a strip of candy, a pair of cooperating shear blades for severing said strip, said blades being pivotally mounted at opposite sides of the strip, arms extending from said blades, and means including a link connecting said arms for simultaneously moving said blades about their pivots in the same direction to shear said strip.

5. In a candy machine, the combination with means to feed the mass of material including a guide-way, of means to sever unit masses of material therefrom at the end of the guideway, said severing means including a pair of arms on opposite sides of the guide-way, means to actuate the arms around their several centers in the same direction, and a pair of blades connected to the arms and extending across the guide-way and adapted to co-operate with each other with a shearing action when the arms are operated, and a knocker for compelling the dislodgment of each severed mass unit from the blades.

6. In a candy machine, the combination with means to feed the mass of material including a guide-way of means to sever unit masses of material therefrom at the end of the guide-way, said severing means including a pair of arms on opposite sides of the guide-way, means to actuate the arms around their several centers in the same direction, and a pair of blades connected to the arms and extending across the guide-way and adapted to co-operate with each other with a shearing action when the arms are operated, and a knocker for compelling the dislodgment of each severed mass unit from the blades, comprising a pivoted member and means to actuate said member.

7. In a candy machine, the combination with means to feed the mass of material including a guide-way of means to sever unit masses of material therefrom at the end of the guide-way, said severing means including a pair of arms on opposite sides of the guide-way, means to actuate the arms around their several centers in the same direction, and a pair of blades connected to the arms and extending across the guide-way and adapted to co-operate with each other with a shearing action when the arms are operated, and a knocker for compelling the dislodgment of each severed mass unit from the blades, comprising a pivoted member and means to actuate said member, said actuating means comprising a rock shaft arranged co-axially with one of said blades.

8. In a lollypop machine, a turntable having a plurality of mold cavities, a plunger adapted to co-operate with said cavities successively, and means for rotating said turntable to bring said cavities successively into position to co-operate with said plunger, said rotating means comprising a ratchet connected with said turntable, a pawl for advancing said ratchet, a second pawl for preventing reverse movement of said ratchet, and a third pawl controlled by movement of said first-named pawl for limiting the advance movement of the ratchet.

9. In a machine of the class described, the combination of a feed channel for feeding sticks in single file toward the delivery end of the channel, a candy carrier having a guide slot for a stick, means for intermittently feeding the candy, and reciprocating means for forcing a stick through said guide slot into the candy.

10. In a candy machine, a travelling mold carrier having a plurality of mold cavities, means for moving the carrier intermittently to bring the candy to a predetermined position, a yielding plunger and a stick-inserting mechanism for inserting a stick into the candy, said plunger being adapted to resiliently compress the candy while a stick is being inserted therein.

11. The combination with means for sizing and intermittently feeding pliable candy material, of complementary cutting devices disposed at the delivery side of said feeding means, means for imparting movement to the said intermittent feeding means and thereafter causing the cutting devices to sever the length of candy material advanced thereby, and means for forcing the severed section of material away from the surface of said cutting devices.

12. The combination with sizing and feeding rollers, of a guideway extending to and from said rollers and disposed axially of the passage between the rollers, and a cutting device disposed transversely across the delivery end of the guideway, the cutting device comprising upper and lower blades pivotally supported at opposite sides of the guideway, means for causing the blades to simultaneously move in opposite directions, and a hammer adjacent the said blades and adapted to be operated subsequently to the movement of the blades to sever the candy material to drive the separated section thereof away from the blades.

13. In a lollypop machine, the combination of a guide channel for delivering sticks, means for feeding sticks in single file in said channel, means for intermittently feeding a mass of candy, a stick guide having a slot, and means for successively pushing sticks through said slot into the candy.

In testimony whereof I affix my signature.

ESECK C. MILLER.